United States Patent [19]

Sakai

[11] Patent Number: 5,099,413
[45] Date of Patent: Mar. 24, 1992

[54] SYSTEM WHICH READS TYPE AND POSITION OF TASK ELEMENT MARKS ON A MATRIX OF PROGRAM TASKS FOR AUTOMATICALLY GENERATING PROGRAMS

[76] Inventor: Sadashiro Sakai, 21, Higashinakafuri 1 chome, Hirakata-shi, Osaka, Japan

[21] Appl. No.: 280,436

[22] Filed: Dec. 6, 1988

[30] Foreign Application Priority Data

Dec. 12, 1987 [JP] Japan ................ 62-314881

[51] Int. Cl.⁵ .................................. G06F 7/06
[52] U.S. Cl. ................... 395/700; 364/256.4; 364/963.3; 364/281.3; 364/286; 364/DIG. 1; 364/DIG. 2
[58] Field of Search ... 364/200 MS File, 900 MS File, 364/300, 474.23, 474.24

[56] References Cited

U.S. PATENT DOCUMENTS

| | | | |
|---|---|---|---|
| 3,439,346 | 4/1969 | McGee | 364/474.23 |
| 3,478,326 | 11/1969 | Bourghardt | |
| 3,798,612 | 3/1974 | Struger | 364/900 |
| 4,029,950 | 6/1977 | Haga | 364/474.23 |
| 4,309,756 | 1/1982 | Beckler | 364/300 |
| 4,315,315 | 2/1982 | Kossiakoff | |
| 4,333,144 | 6/1982 | Whiteside et al. | 364/200 |
| 4,455,619 | 6/1984 | Masui et al. | 364/900 |
| 4,566,061 | 1/1986 | Ogden | 364/191 |
| 4,607,327 | 8/1986 | Kishi | 364/191 |
| 4,627,003 | 12/1986 | Kishi | 364/191 |
| 4,658,351 | 4/1987 | Teng | 364/200 |
| 4,660,148 | 4/1987 | Kishi et al. | 364/474 |
| 4,700,290 | 10/1987 | Ichikawa | 364/474.23 |
| 4,710,863 | 12/1987 | Kaufmann | 364/191 |
| 4,734,854 | 3/1988 | Afshar | 364/200 |
| 4,742,467 | 5/1988 | Messerich et al. | 364/200 |
| 4,796,179 | 1/1989 | Lehman | 364/300 |
| 4,802,116 | 1/1989 | Ward | 364/900 |
| 4,809,170 | 2/1989 | Leblang et al. | 364/200 |
| 4,890,234 | 12/1989 | Tanaka | 364/474.23 |

OTHER PUBLICATIONS

"Software State Machine Design and the 'Compeditor', the First Finite State Machine Compiler and Editor", Allen Y. Edelberg—1987 IEEE Southeastern Conference.
European Search Report: Appln. No. 88120622.1; Applicant: Mostec Inc. et al.

Primary Examiner—Thomas C. Lee
Assistant Examiner—Eric Coleman
Attorney, Agent, or Firm—Beveridge, DeGrandi & Weilacher

[57] ABSTRACT

An automatic program generating device and method which involves the dividing of a whole work to be processed into a plurality of tasks and providing a plurality of free-setting task elements. The free-setting task elements each include an incomplete program. The tasks and free-setting task elements are arranged about an inner matrix configuration provided on a frame body such that a respective one of the tasks represents each row (or column) of the matrix and a respective one of the free-setting task elements represents each column (or row) of the matrix. The intersections of the columns and rows of the matrix define cross-points upon which are positioned a plurality of different types of fixed task element marks. The fixed task elements represent various operation program parts stored in a memory device. A reading device interprets the position and type of the fixed task element marks and relays that information to a fetching device which fetches the appropriate operation program part represented by the fixed element task mark and combines it with the incomplete program of the free-setting task element associated with the fixed task element mark so as to generate a complete program.

12 Claims, 5 Drawing Sheets

SYSTEM WHICH READS TYPE AND POSITION OF TASK ELEMENT MARKS ON A MATRIX OF PROGRAM TASKS FOR AUTOMATICALLY GENERATING PROGRAMS

BACKGROUND OF THE INVENTION

1. Field of the Invention

The present invention relates to a method and a device of automatic program generation for automatically generating programs by eliminating coding works.

2. Description of the Related Art

For generating computer programs by a conventional method, plans of computer programs are proposed, specifications thereof are reviewed, and then basic and detailed designs are worked out. Proposed computer programs are coded into a specified language and checked for incorrect codings. As shown in FIG. 1, the coded program (A1) is then stored (A2) into a computer by means such as a keyboard so as to generate a source text (A3). An operator checks the syntax of such source text and then compiles or assembles it (A4). Incorrect key entries and grammatical errors are checked (A5). Incorrect entries or grammatical errors which are identified are printed (A6), corrected, recoded, and the above activities are repeated. After incorrect entries and grammatical errors are eliminated, the value of the program is evaluated (A7) and the system of an object of control is simulated (A8). Programs are developed and generated conventionally in a manner described such as above.

However, in a conventional program generation, an operator has to become fully familiar with a specific language such as a symbolic language, FORTRAN language and C language and further an enormous amount of statements have to be coded sequentially by using such language with potential errors in writing such as '0' for 'O' being highly likely to occur.

There have been proposed methods for generating programs without coding for the above reason but it cannot be said that such methods have met with much success in providing solutions to the problems presented by conventional program generation techniques.

SUMMARY OF THE INVENTION

An object of the present invention is to provide a method and a device for automatic program generation which is capable of generating programs and of eliminating coding without the operator having to become familiar with a programming language.

The present invention is an automatic program generating method, wherein the content of a whole work or an entire operational system to be processed is divided into a plurality of tasks, each task being assigned to the row or the column of a matrix or a table, a free-setting task element common to each task is assigned to the column or the row of the matrix or table, a fixed task element mark, which identifies the content of the task to be processed with the content of the free-setting task element, is assigned to a specified position of the matrix or table in correspondence with the content of each task to be processed, the type and the position of this mark are read, and based on this reading, a previously prepared incomplete program statement is fetched so as to generate a program which corresponds with the content of the task and free-setting element as identified by said fixed task element mark.

Further the present invention is an automatic program generating device comprising;

an information holding frame body which has rows or columns of a matrix or table where a plurality of tasks constituting the content of the whole work processed is to be assigned columns or rows of the matrix or table and where a free-setting task element, common to each task thereof, is assigned to the columns or rows not already represented by said tasks moreover, there is provided an inside part of the matrix or table wherein a fixed task element mark is assigned to identify the processed content of the task with the free-setting task element.

There is also provided mark reading means for reading the type and position of the the fixed task element mark of such information holding frame body as well as a memory means which stores in advance an incomplete program statement which corresponds with the combination of task and free-setting task element as represented by the fixed task element mark, and a statement generating means for fetching the previously prepared program statement described above thereby generating programs based on the type and position read by the mark reading means.

Further the present invention is an automatic program generating device according to the present invention comprising;

an information holding body which has rows or columns of a matrix or table where a plurality of tasks constituting the content of the whole work to be processed is assigned to one set of columns or rows of the matrix or table and where a free-setting task element is assigned to the remaining set of column or rows perpendicularly arranged with the first set of column or rows.

There is assigned to an inside part of the matrix or table a fixed task element mark, which is used for identifying the processed content of the task with the free-setting task element.

There is also provided mark reading means for reading the type and position of the fixed task element mark of such information holding body as well as a memory means which stores in advance an incomplete program statement corresponding with the fixed task element mark.

Also included is a statement generating means for fetching the previously prepared program statement described above so as to assist in the generation of programs based on the type and position read by the mark reading means.

DESCRIPTION OF THE PREFERRED EMBODIMENTS

The present invention will hereunder be described further with reference to the drawings which show the embodiments thereof.

Figure 1:
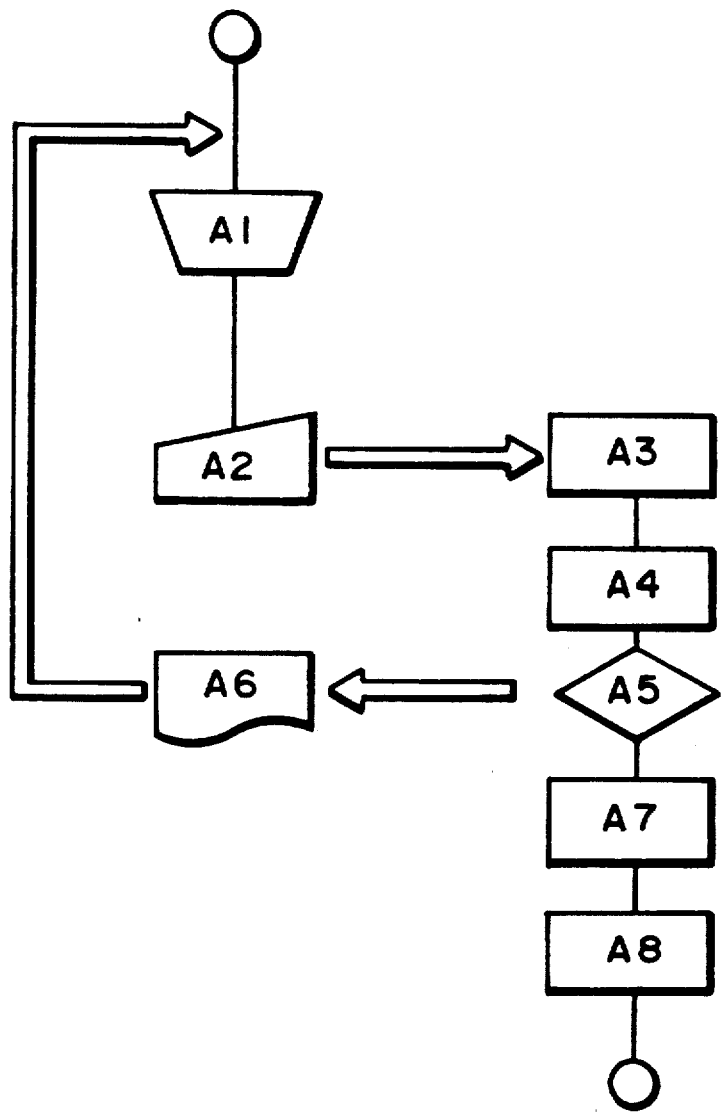
FIG. 1 is a flowchart showing a conventional program generating method.
Figure 2:
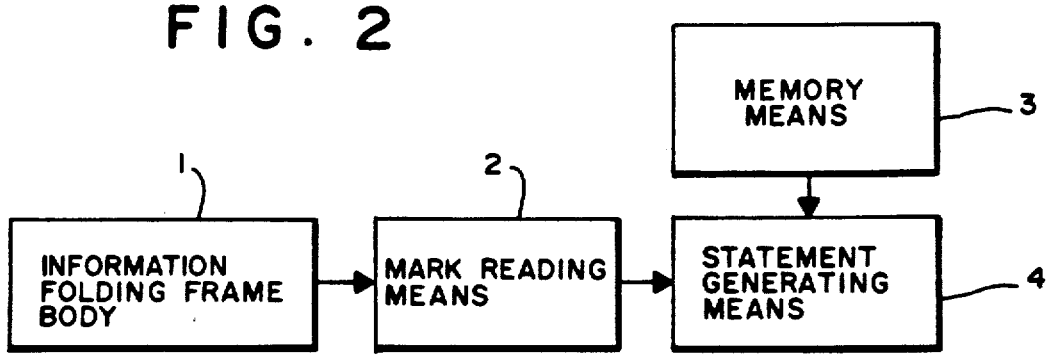
FIG. 2 is a block diagram showing an embodiment of an automatic program generating device according to the present invention.
Figure 4:
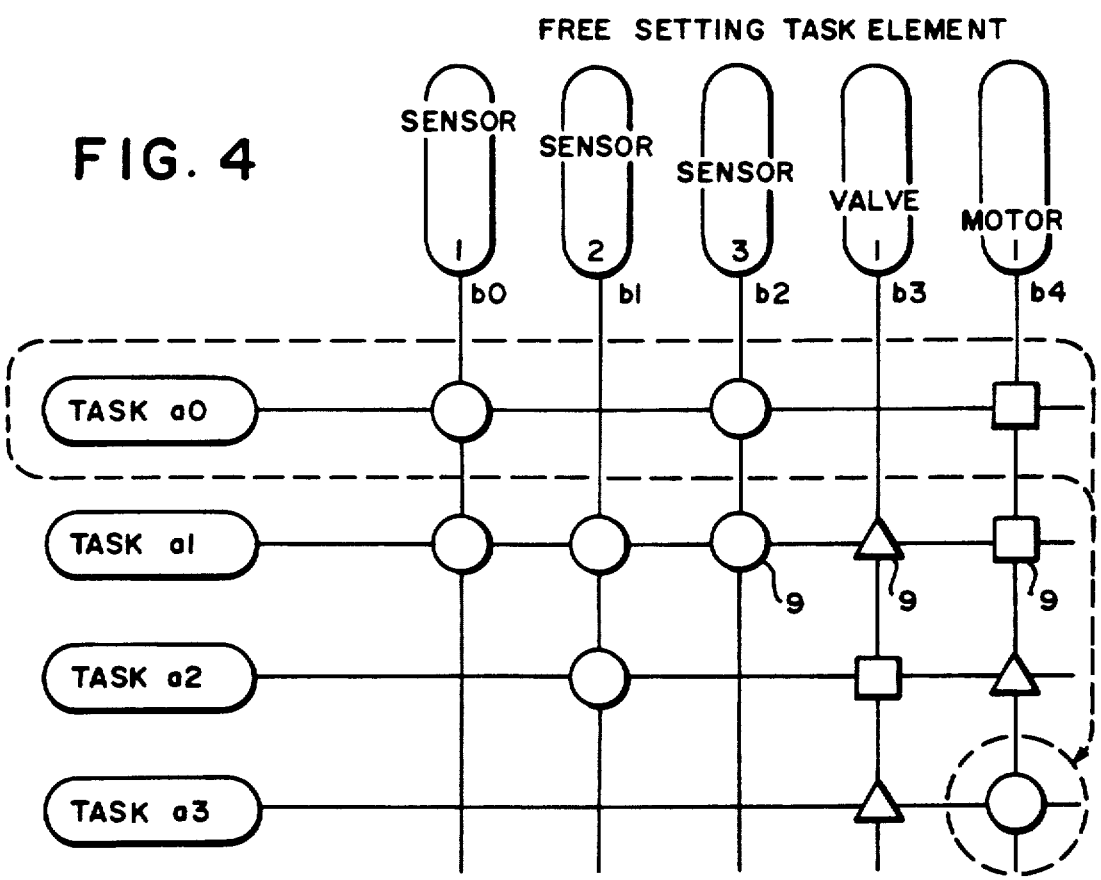
FIG. 4 is a plan view of another information holding frame body used in the above embodiment.
Figure 3:
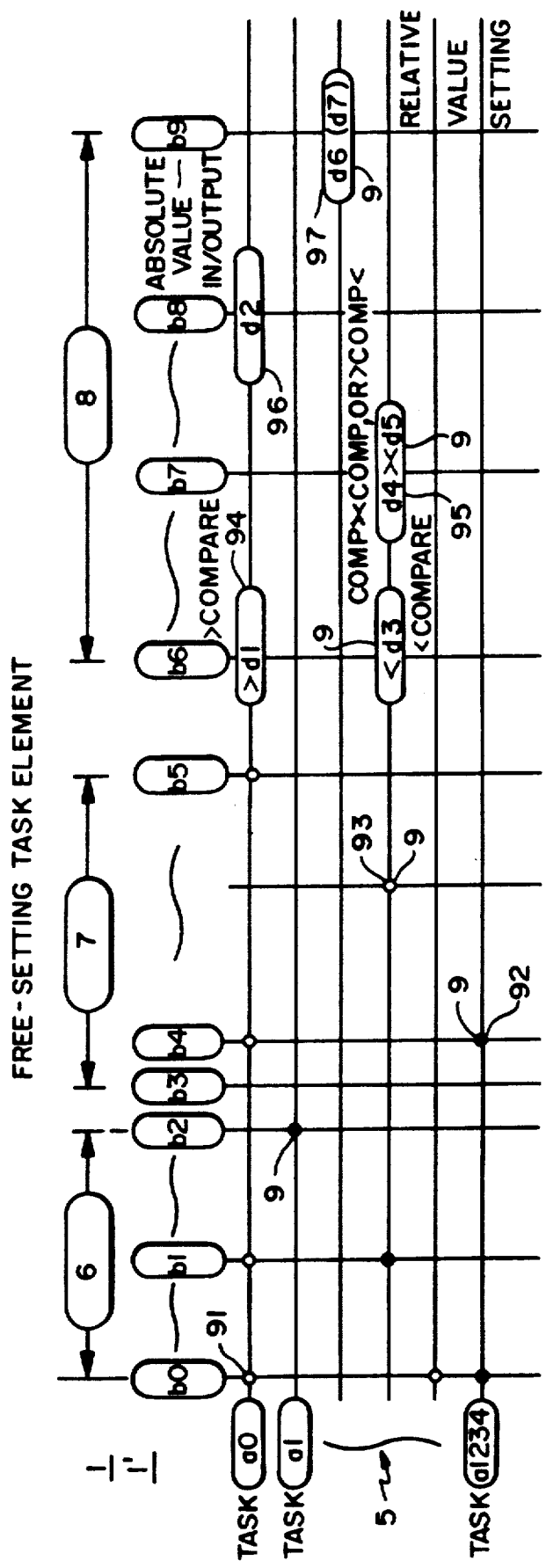
FIG. 3 is a plan view of an information holding frame body used in the above embodiment.

FIG. 2 is a block diagram showing an embodiment of the automatic program generating device according to the present invention. FIG. 3 is a plan view of the information holding frame body 1 which is used for the embodiment shown in FIG. 2 and FIG. 4 is a partial plan view showing a concrete example of the status the information holding frame body 1 shown in FIG. 3 assumes when in operation. The information holding frame body 1 consists of a body which is made from sheet-like material such as, for example, paper, wood, plastics, metal and/or other materials. Alternatively, holding frame body 1 can be in the form of a viewing screen such as a cathode ray tube, liquid crystal screen or similar picture displaying device. Frame body 1 may be one which is a thick body such as a blackboard consisting either of the above materials or any one which is capable of holding information such as a cube or a drum-like body. On the body 1 is formed the matrix 5.

Each line thereof is designed so that a plurality of tasks a0–a1234, which together constitute the content of the whole work to be processed, are disposed so as to correspond with one another. When tasks a0–a1234 are executed, respectively, the whole work to be processed will have been executed. Tasks a0–a1234 are collected together as a unit for processing to preferably bring forth an intermediate result or, alternatively a final result. For example, as shown in FIG. 4, in the case of a designated operation wherein 'the access to and from a place is appropriately controlled of persons entering the place from outside and persons staying inside the place in a double door system having a first door and a second door', the aforementioned tasks acts as a unit where 'if something is outside the first door and the weight thereof is over 30 kgs., the unit recognizes that something which is not a dog or a cat but a human being is outside the door and causes the motor for opening the first door to be driven' (task a0), 'if some thing is outside the first door and the weight thereof is over 30 kgs. and if someone is between the first door and the second door which is inside the first door, the unit drives the motor to open the door 1 and drives the valve so as to close the second door' (task a1), 'if nothing is outside the first door and someone is between the first door and the second door which is inside the first door, the unit drives the motor so as to close the first door and drives the valve so as to open the second door' (task a2), and 'if the unit is driving the motor so as to open the first door, the unit drives the valve so as to close the second door' (task a3) and so on. In order to realize further appropriately the contents of the above designation operation to be achieved, relations of conditions should further be analyzed for addition to the operation.

As shown in FIG. 3, the columns of the aforementioned matrix 5 are designed so that a plurality of free-setting task elements b0–b9, are perpendicularly arranged to the rows assigned to tasks a0–a1234 of the matrix 5. A free-setting task element is an element which shares a common feature among the tasks constituting the entire operation and can be freely set by a user. For example, such free-setting task element can correspond with the whole or a part of the operand area of a program statement. More specifically, for example, in the operation of the aforementioned door arrangement, such free-setting task elements include 'the sensor 1 for detecting the presence of something outside the first door' (task element b0) 'the sensor 2 for detecting the presence of someone between the first door and the second door' (task element b1), 'the sensor 3 for detecting the weight of someone outside the first door' (task element b2), 'the valve for opening and closing the second door' (task element b3), and 'the motor for opening and closing the first door' (task element b4). The aforementioned free-setting task elements include a conditional character, data derivative character, consequential character, operation judging character, and another character. For example, the conditional character of the free-setting task elements is represented by the aforementioned 'sensor 1 for detecting the presence of something outside the first door' (task element b0), 'sensor 2 for detecting the presence of someone between the first door and the second door' (task element b1), 'sensor 3 for detecting the weight of someone outside the first door' (task element b2), while the consequential character is represented by the aforementioned 'valve for opening and closing the second door' (task element b3) and 'motor for opening and closing the first door' (task element b4).

The conditional character, data derivative character, and consequential character and so on of the aforementioned free-setting task elements b0–b9 are dependent upon and are variable to each of tasks a0–a1234. For example, in the task a3, 'motor for opening and closing the first door' (task element b4) has the conditional character. That is to say, the consequence of a certain task can be based on the condition or assumptive element of another task.

A plurality of the aforementioned free-setting task elements b0–b9 are collected together by the aforementioned consistent character and arranged in a zone, as shown in FIG. 3. For example, 6 denotes the ON/OFF character zone, 7 denotes the consequential character zone and 8 denotes input/output character zone.

The inside of the aforementioned matrix 5 is designed so that the fixed task element mark 9 is provided for identification of the aforementioned content of each task of a0–a1234 with free-setting task element b0–b9. The fixed task element mark 9 has a plurality of types, each of which has the content predetermined respectively. For example, such fixed task element mark 9 corresponds with the operation area of a program statement. The operation part referred to herein does not mean the operation part in public use only but also means the operation part which is further added with a fixed operand in part or whole under certain circumstances. In FIG. 4 ◯ means that it has a conditional character and that this ◯ causes the conditional character to read the data of the free-setting task element of the matrix column to which the mark thereof belong, and to check whether the conditional character is ON (for example, the BTST command). ☐ denotes that it is the consequential character and that it drives the free-setting task element of the matrix column to which the mark thereof belong (for example, the BSET command). Δ denotes that it is the consequential character and that it stops driving the free-setting task element of the matrix column to which the mark thereof belong (for example, the BCLR command). Further, ◯ in the task a3 represents the conditional character and means that it reads the free-setting task element to which the conditional character belongs and checks whether the conditional character is ON.

The identification of the processed contents of the aforementioned task means allows for the completion of a program statement for example, the aforementioned operation part is combined with the aforementioned operand part thereby completing a program statement (for example, the BTST #$0, (A0), expressed by machine language as 98C400000004). Referring to the example mentioned above, such identification means to complete a program statement which corresponds with the concrete contents that 'the output of the sensor 2 for detecting the presence of someone between the first door and the second door is read to determine whether the sensor 2 is ON'.

The fixed task element mark 9 may be any means such as formula, kanji, numerals, characters, geometrical shapes or patterns or color marks.

Contents of the fixed task element mark 9 includes, for example, various types of operation parts as described above which contain a command for setting bit (93 in FIG. 3), a command for clearing bit (92 in FIG. 3), a command for setting bit (91 in FIG. 3), a command for comparing data with a constant values d1 (94 in FIG. 3), a command for comparing data with constant values d4 and d5 (95 in FIG. 3), a command for setting data of absolute value to a variable d2 (96 in FIG. 3), and a command for setting data of relative value (97 in FIG. 3).

In FIG. 2, the mark reading means 2 is means for reading the type and the position of the aforementioned fixed task element mark 9 of the aforementioned information holding frame body 1. An information holding body 1' comprises the information frame holding body 1 and the information. As an example thereof, it is means such as an optical reading device if the aforementioned information holding frame body 1 is a sheet-like body and it is a CPU (Central Processing Unit) for reading information such as the fixed task element mark 9 generated on the screen thereof if the frame body 1 is the screen of the CRT. Further other means such as the mark reading means of magnetic types and air pressure types are also possible. In addition, the aforementioned mark reading means 2 can be equipped with a pattern recognition function.

The memory means 3 is means such as a ROM (read only memory) which stores in advance various incomplete program statements that correspond with the aforementioned fixed task element mark 9.

The statement generating means 4 is means for fetching the incomplete program statement prepared in advance in the aforementioned memory means 3 based on the type and position of the mark which is read by the aforementioned mark reading means 2, thereby completing a program by combining the fetched program statement with the content of the free-setting task element.

A second automatic program generating device of the present invention is only different from the first automatic program generating device of the present invention as far as the information holding frame body 1 is concerned. In other words, in the second automatic program generating device, instead of the aforementioned information holding frame body 1, the information holding body 1' stored with the task a0–a1234, free-setting task element b0–b9, and fixed task element mark 9 described above, is the component.

The following describes operations of the embodiment of the aforementioned first automatic program generating device of the present invention and an embodiment of the method of the present invention.

First, a maker is to cause the memory means 3 to store in advance a number of incomplete program statements such as machine language, symbolic language or higher language which corresponds with the type of many operation parts (command) so as to allow processing of diversified tasks. The maker further causes such incomplete program statements to correspond with symbols or numerals such as ○, □, △, ■, and ● to designate the aforementioned fixed task element 9. The maker then causes each matrix column of the aforementioned matrix 5 to correspond with the port for external input and output of the controlling computer on a one-to-one basis.

A user divides the content of the task to be processed into a plurality of task elements a0–a1234. Each task elements a0–a1234 is caused to correspond with the line of the matrix 5 of the aforementioned information holding frame body 1 on one-to-one basis and arranged accordingly. In the example described above, the tasks are arranged in such order as 'if someone is outside the first door and the weight of such person is over 30 kgs., the task recognizes that the object which is not a dog or a cat but a human being is outside the door and causes the motor to open the first door' (task a0), 'if someone is outside the first door and the weight of such person is over 30 kgs. and someone is between the first door and the second door which is inside the first door, the task drives the motor so as to open the door 1 and drives the valve so as to close the second door' (task a1), 'if no one is outside the first door and someone is between the first door and the second door which is inside the first door, the task drives the motor so as to close the first door and drives the valve so as to open the second door' (task a2), and 'if the motor is being driven so as to open the first door, task drives the valve so as to close the second door' (task a3).

The free-setting task elements b0–b9, which are common to tasks a0–a1234 are arranged to correspond with the columns of the aforementioned matrix 5. In the examples above, such tasks are accomplished by the 'sensor 1 for detecting the presence of someone outside the first door' (task element b0), 'sensor 2 for detecting the presence of someone between the first door and the second door' (task element b1), 'sensor 3 for detecting the weight of the person outside the first door' (task element b2), 'valve for opening and closing the second door' (task element b3), and 'motor for opening and closing the first door' (task element b4). The port for external input and output of the aforementioned controlling computer is connected to the aforementioned sensor 1, sensor 2, sensor 3, valve, and motor.

Then, the fixed task element mark 9 which identifies the content of the task with the aforementioned free-setting task element b0–b9, are provided at the specified positions of the aforementioned matrix 5 or table in correspondence with the content of the processed task. In the task a0 shown in FIG. 4, the mark ○ is provided with the column of the sensor 1 and sensor 3 and the mark □ is provided with the column of the motor. Such arrangement will process the task that 'if something is outside the first door and the weight of such object is over 30 kgs., the task recognizes that an object which is not a dog or a cat but a human being is outside the door and drives the motor for opening the first door'. In other tasks, sensors and motor are marked in the same manner according to the content of the task. In such a way as above, the information holding frame body 1 is to be completed.

Then, the mark reading means 2 reads the type and the position on the matrix 5 of this mark on the information holding body 1' stored with various information.

The statement generating means 4 of the automatic program generating device of the present invention fetches from the aforementioned memory means 2 an incomplete program statement (MOVE, for example) which corresponds with the type of the mark read by the aforementioned mark reading means 2, combines the fetched incomplete program statement with the content (#$01, A0, for example) of the free-setting task element for the position of the read mark, and completes a program statement (MOVE #$01, A0). If an incomplete statement of machine language is prepared in the memory means 2 during program statement completion, there is a merit that the program (498F00010000) comprising machine language can be generated directly.

In such manner as above, when the programming of the task a0 is completed, the program statement is then completed of the task a1 in like manner.

Figure 5:
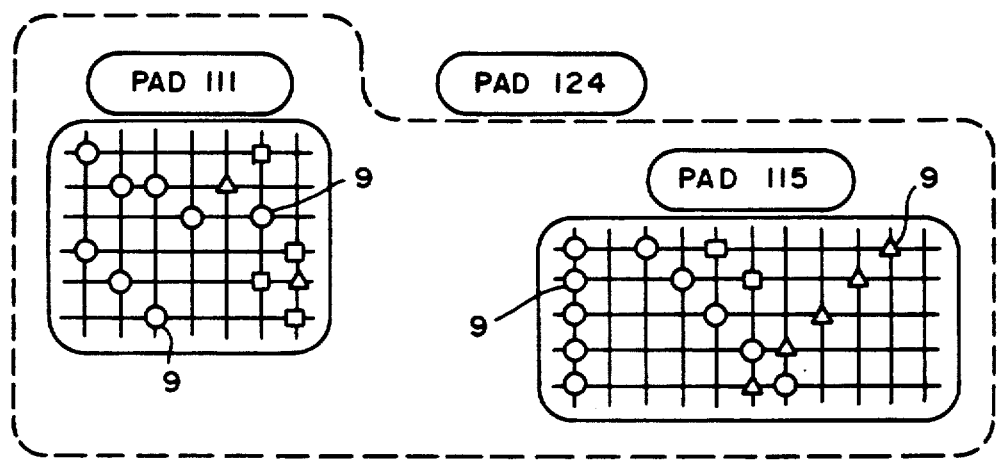
FIG. 5 is a plan view of a pad used for the information holding frame body shown in FIG. 4.

FIG. 5 is a plan view showing the specified area (hereafter called pad) of the aforementioned matrix 5. The user encloses a constant area with predetermined lines, causes the reading means 2 to read such enclosed constant area, and can cause the output '1' to be issued to any free-setting task element when the condition within the enclosed constant area satisfies certain condition. In other words, one of such pads is the pad 111, and an incomplete program statement which can issue '1' in advance as a warning for the memory means 3 is to be prepared. The statement generating means 4 combines the aforementioned read area with the incomplete statement, checks all conditions in connection with the fixed task element mark 9 in such as status as shown in FIG. 5, and completes the statement which issues '1' after such conditions are satisfied. The pad 115 is also a similar pad as above. The pad 124 means that it issues '1' when the aforementioned pad 111, 115 issues '1' simultaneously. As stated above, what is called hierarchical structure is realized. When assigning the pad, a red mark can be added to the side of each mark instead of enclosing with a line, or the pad can be assigned by adding a # mark to the side of each mark.

In this manner, the user can generate a program by allocating tasks and free-setting task elements to the lines (rows) and columns of the matrix 5 and by adding the fixed task element marks.

The user sets the program generated in such manner into the aforementioned controlling computer, which in turn controls the object to be controlled by repeated execution of the program.

The aforementioned matrix 5 may be what is called a table and further the rows and columns stated above may be replaced.

Also, the aforementioned information holding frame body 1 may be divided into some number of mark sheets.

Figure 6:
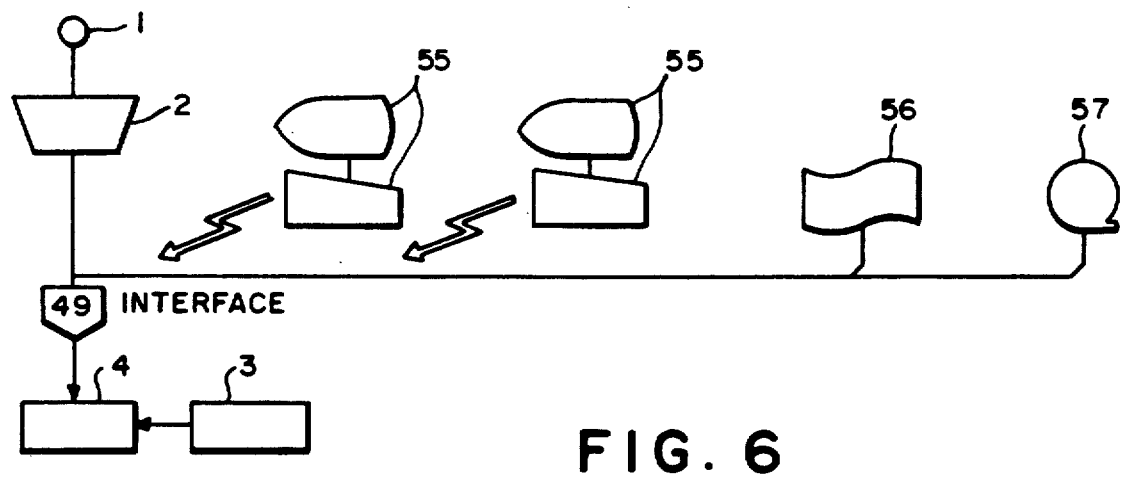
FIG. 6 is a block diagram illustrating another embodiment of the present invention.
Figure 7:
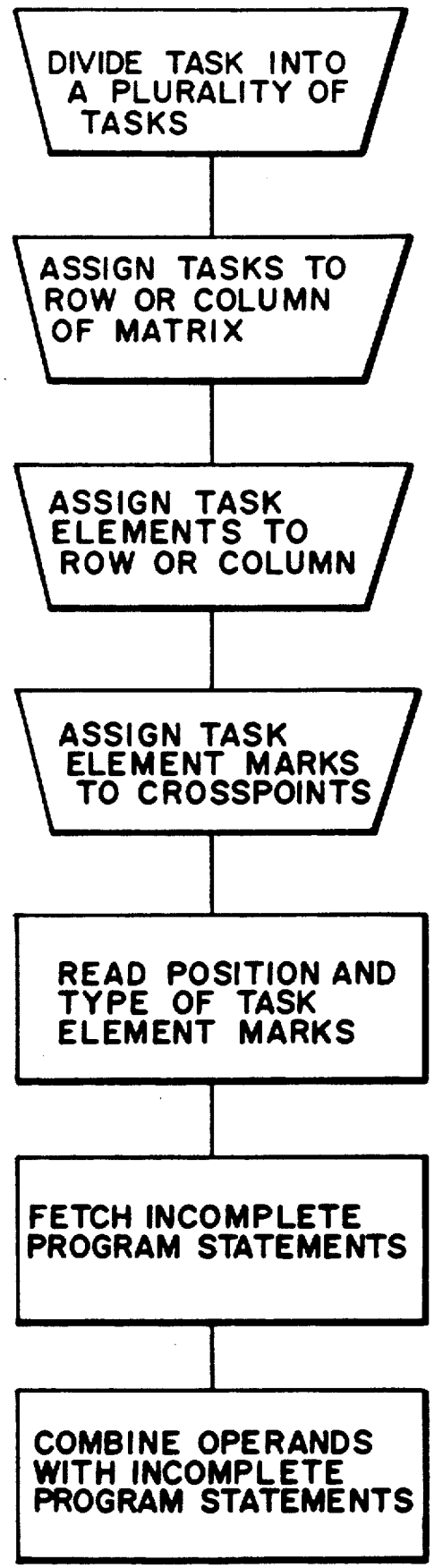
FIG. 7 is a flow chart illustrating the method of automatic generation of a program.

As shown in FIG. 6, the information from the information holding body 1' is not read directly from the sheet like body but may be generated by a remote terminal device 55 and caused to be applied utilizing a communication line. The information may be caused to be stored in the paper tape 56 and the magnetic recording medium 57 and caused to be entered.

Because of the construction described above, the automatic program generating device according to the present invention does not require the operator to know the programming language nor does it require an operator to perform an enormous amount of coding works. Therefore, programs can be easily generated without having to correct erroneous coding.

It is further understood by those skilled in the art that the foregoing description is a preferred embodiment and that various changes and modifications may be made in the invention without departing from the spirit and scope thereof.

I claim:

1. An automatic program generating method comprising the steps of:

a step where a whole work to be processed is divided into a plurality of tasks, each task of said work being assigned to a row or column of a matrix or a table with the rows and columns of said matrix or table intersecting to form a plurality of crosspoints;

a step where free-setting task elements, each having a status corresponding to at least part of an operand for a program statement and each being associated with one or more of said tasks, are assigned to the columns or rows of said matrix or table;

said free-setting task elements including i) a conditional character free-setting task element, the status of which corresponds to at least part of an operand for a conditional program statement, and ii) a consequential character free-setting task element, the status of which corresponds to at least part of an operand for a consequential program statement;

a step where fixed task element marks, each corresponding to an incomplete program part, are assigned to at least one of said cross-points of said matrix or table in order to designate the association of at least one of said tasks with at least one of said free-setting task elements;

a step where the type and position of the fixed task element marks are read by a mark reading device at every task;

a step where a previously prepared incomplete program statement, which comprises a conditional character part and a consequential character part, with said parts corresponding to like types of said fixed task element marks, is fetched at every task by statement generating means, and a step where a program is completed by said statement generating means at every task by communicating with said reading device to determine the type and position of the fixed task element marks so that i) said conditional part of said incomplete program statement is completed by combining said at least part of said operand corresponding to said status of said conditional character free-setting task element with said conditional character incomplete program statement part corresponding to said conditional fixed task element mark, and ii) said consequential part of said incomplete program statement is completed by combining at least part of said operand corresponding to said status of said consequential character free-setting task element with said consequential character incomplete program statement part corresponding to said consequential fixed task element mark.

2. An automatic program generating method according to claim 1, wherein
   each of said tasks is a process which brings forth a prescribed intermediate or final consequence.

3. An automatic program generating method according to claim 1, wherein
   the aforementioned character types of the aforementioned free-setting task elements may be different depending on each task.

4. An automatic program generating method according to claim 1, wherein
   a plurality of the aforementioned free-setting task elements are collected together by the aforementioned character types and assigned to a corresponding zone of said matrix or table.

5. An automatic program generating device according to the present invention comprising:
   an information holding frame body which has a matrix or table comprising rows and columns which intersect to form a plurality of cross points;
   a plurality of tasks which together constitute a work to be processed, said plurality of tasks being assigned to columns or rows of said matrix or table;
   a plurality of free-setting task elements each being associated with at least one of said tasks, each of said plurality of free-setting task elements being assigned to columns or rows of said matrix, and each having a status corresponding to at least part of an operand for a program statement;
   said free setting task elements including
   i) a conditional character free-setting task element having a status corresponding to at least part of an operand for a conditional program statement, and
   ii) a consequential character free-setting task element having a status corresponding to at least part of an operand for a consequential program statement;
   fixed task element marks each of a predetermined type which correspond to an incomplete program part, said fixed task element marks designating the association of at least one of said tasks with at least one of said free-setting task elements, said fixed task element marks being positioned on said cross-points of the matrix or table so as to designate the association of the task to be processed with the free-setting task element aligned with said fixed task element mark;
   a mark reading device for reading the type and position of said fixed task element marks;
   a memory means which stores in advance an incomplete program statement which comprises a conditional character part and a consequential character part, each corresponding to a like type of said fixed task element mark; and
   a statement generating means for fetching at every task the previously prepared incomplete program statement and for generating at every task a complete program in a manner such that
   i) said fetched conditional character incomplete program statement part is completed by combining said at least part of the operand corresponding to a status of said conditional character free-setting task element with said conditional character incomplete program statement corresponding to said conditional fixed task element mark, and
   ii) said fetched consequential character incomplete program statement part is completed by combining said at least part of the operand corresponding to a status of said consequential character free-setting task element with said consequential character incomplete program statement corresponding to said consequential fixed task element mark, said combining being determined by the association designated by said fixed task element mark.

6. An automatic program generating device according to claim 5, wherein each of said tasks is a process which brings forth a prescribed intermediate or final consequence.

7. An automatic program generating device according to claim 5, wherein
   a plurality of the aforementioned free-setting task elements are collected together by the aforementioned constant character and assigned to a zone.

8. An automatic program generating device according to claim 5, wherein the aforementioned information holding frame body is a sheet-like body formed of a material selected from the group of paper, wood, plastics, metal, or any combination thereof.

9. An automatic program generating device according to claim 4 or claim 5, wherein the aforementioned information holding frame body is a cathode ray tube, liquid crystal screen, or a screen of other picture displaying device.

10. An automatic program generating method comprising the steps of:
    a step where a whole work to be processed is divided into a plurality of tasks, each task thereof is assigned to a row or a column of a matrix or a table with the rows and columns of said matrix or table intersecting to form a plurality of cross-points;
    a step where free-setting task elements, each having a status corresponding to at least part of an operand for a program statement, and each being associated with one or more of said tasks, are assigned to the columns or rows of said matrix or table;
    said free-setting task elements including
    i) a conditional character free-setting task element having a status corresponding to at least part of an operand for a conditional program statement, and
    ii) a consequential character free-setting task element having a status corresponding to at least part of an operand for a consequential program statement, said character free-setting task elements being collected together by character type and assigned to different zones of said table or matrix, respectively;
    a step where a fixed task element mark each corresponding to an incomplete program part, is assigned to at least one of said cross-points of said matrix or table in order to designate the association of one of said tasks with one of said free-setting task elements;
    a step where the type and position of the fixed task element mark is read by a mark reading device at every task;
    a step where a previously prepared incomplete program statement, which comprises a conditional character part and a consequential character part, with said parts corresponding to like types of said fixed task element marks, is fetched at every task by statement generating means, and a program is completed by said statement generating means at every task by communicating with said reading device to determine the type and position of the fixed task element marks so that i) said conditional part of said incomplete program statement is completed by combining said at least part of the operand corresponding to said status of said conditional character free-setting task element with said conditional character incomplete program statement part corresponding to said conditional fixed task element mark, and ii) said consequential part of said incomplete program statement is completed by combining at least part of said operand corresponding to said status of said consequential character free-setting task element operand with said consequential character incomplete program statement part corresponding to said consequential fixed task element mark.

11. An automatic program generating device according to the present invention comprising;

an information holding frame body which has a matrix or table comprising rows and columns which intersect to form a plurality of cross points;

a plurality of tasks which together constitute a work to be processed, said plurality of tasks being assigned to columns or rows of said matrix or table;

a plurality of free-setting task elements each being associated with at least one of said tasks, each of said plurality of free-setting task elements being assigned to columns or rows of said matrix, and each having a status corresponding to at least part of an operand for a program statement;

said free-setting task elements including i) a conditional character free-setting task element having a status corresponding to at least part of an operand for a conditional program statement, and ii) a consequential character free setting task element having a status corresponding to at least part of an operand for a consequential program statement, said free-setting task elements being collected together by their character type and assigned to different zones of said matrix or table, respectively;

fixed task element marks each of a predetermined type which corresponds to an incomplete program part, said fixed task element marks designating the association of one of said tasks with one of said free-setting task elements, said fixed task element marks being positioned on said cross-points of the matrix or table so as to designate the association of the task to be processed with the free-setting task element aligned with said fixed task element mark;

a mark reading device for reading the type and position of said fixed task element marks;

a memory means which stores in advance an incomplete program statement which comprises a conditional character part and a consequential character part, each corresponding to a like type of said fixed task element mark; and a statement generating means for fetching at every task the previously prepared incomplete program statement and for generating at every task a complete program in a manner such that i) said fetched conditional character incomplete program statement is completed by combining said at least part of the operand corresponding to said status of said conditional character free-setting task element with said conditional character incomplete program statement corresponding to said conditional fixed task element mark, and ii) said fetched consequential character incomplete program statement is completed by combining said at least part of the operand corresponding to said status of said consequential character free-setting task element with said consequential character incomplete program statement corresponding to said consequential fixed task element mark said combining being determined by the association designated by said fixed task element mark.

12. An automatic program generating method according to claim 1, wherein a single fixed task element corresponds with a plurality of free-setting task elements, and said task elements interrelate such that more than one free-setting task element is necessary to complete said task.

* * * * *